US012148924B2

(12) United States Patent
Yamaguchi et al.

(10) Patent No.: US 12,148,924 B2
(45) Date of Patent: Nov. 19, 2024

(54) ANODE ACTIVE MATERIAL FOR NON-AQUEOUS ELECTROLYTE SECONDARY BATTERY, ANODE, BATTERY, AND LAMINATE

(71) Applicant: SUMITOMO CHEMICAL COMPANY, LIMITED, Tokyo (JP)

(72) Inventors: Takitaro Yamaguchi, Tsukuba (JP); Hiroaki Hoshikawa, Niihama (JP); Toshiaki Kumagai, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 468 days.

(21) Appl. No.: 17/295,034

(22) PCT Filed: Oct. 17, 2019

(86) PCT No.: PCT/JP2019/040910
§ 371 (c)(1),
(2) Date: May 18, 2021

(87) PCT Pub. No.: WO2020/105330
PCT Pub. Date: May 28, 2020

(65) Prior Publication Data
US 2022/0013769 A1 Jan. 13, 2022

(30) Foreign Application Priority Data
Nov. 22, 2018 (JP) .................................. 2018-219613

(51) Int. Cl.
*H01M 4/46* (2006.01)
*H01M 4/02* (2006.01)
(Continued)

(52) U.S. Cl.
CPC ............ *H01M 4/463* (2013.01); *H01M 4/134* (2013.01); *C22C 21/00* (2013.01); *C22C 21/02* (2013.01);
(Continued)

(58) Field of Classification Search
CPC ................. H01M 4/463; H01M 4/134; H01M 2004/0027; H01M 10/0525; C22C 21/00; C22C 21/02; C22C 21/06
See application file for complete search history.

(56) References Cited

U.S. PATENT DOCUMENTS 4,056,885 A 11/1977 Rao
2002/0001749 A1* 1/2002 Hashimoto ........... H01M 4/386
429/223
(Continued)

FOREIGN PATENT DOCUMENTS

CN 105845919 A 8/2016
JP 62-020246 A 1/1987
(Continued)

OTHER PUBLICATIONS

Fleischauer M.D. et al: "Al—Si Thin-Film Negative Electrodes for Li-Ion Batteries", Journal of the Electrochemical Society, vol. 155, No. 11, Sep. 22, 2008 (Sep. 22, 2008), pp. A851-A854.
(Continued)

*Primary Examiner* — Eugenia Wang
(74) *Attorney, Agent, or Firm* — Rimon P.C.

(57) ABSTRACT

An anode active material for a non-aqueous electrolyte secondary battery, including: an aluminum phase; and a non-aluminum metal phase dispersed in the aluminum phase, in which the non-aluminum metal phase is formed of a non-aluminum metal compound containing one or more selected from the group consisting of Si, Ge, Sn, Ag Sb, Bi, In, and Mg, and an amount of the non-aluminum metal phase
(Continued)

with respect to a total amount of the aluminum phase and the non-aluminum metal phase is 0.01 mass % or more and 8 mass % or less.

15 Claims, 1 Drawing Sheet

(51) Int. Cl.
 *H01M 4/134* (2010.01)
 *C22C 21/00* (2006.01)
 *C22C 21/02* (2006.01)
 *C22C 21/06* (2006.01)

(52) U.S. Cl.
 CPC ....... *C22C 21/06* (2013.01); *H01M 2004/027* (2013.01)

(56) References Cited

U.S. PATENT DOCUMENTS

| | | | | |
|---|---|---|---|---|
| 2010/0310937 | A1* | 12/2010 | Krause | H01M 10/0436 429/231.95 |
| 2014/0238550 | A1 | 8/2014 | Inoue | |
| 2018/0233748 | A1* | 8/2018 | Zhamu | H01M 10/36 |

FOREIGN PATENT DOCUMENTS

| | | |
|---|---|---|
| JP | 63-013265 A | 1/1988 |
| JP | 03-017961 A | 1/1991 |
| JP | 03-254064 A | 11/1991 |
| JP | 04-163861 A | 6/1992 |
| JP | 06-044968 A | 2/1994 |
| JP | 07-130358 A | 5/1995 |
| JP | 09-180968 A | 7/1997 |
| JP | 2011-228058 A | 11/2011 |
| JP | 2012-529747 A | 11/2012 |
| JP | 2014-165001 A | 9/2014 |
| JP | 2016-194118 A | 11/2016 |
| JP | 2016-204712 A | 12/2016 |
| JP | 2016-204713 A | 12/2016 |
| WO | 2010/144320 A2 | 12/2010 |

OTHER PUBLICATIONS

Extended European Search Report issued in corresponding European Patent Application No. 19887029.7-1103, dated Jun. 30, 2022.
International Search Report issued in corresponding International Patent Application No. PCT/JP2019/040910, dated Dec. 24, 2019, with English translation.
First Office Action received in corresponding Chinese Patent Application No. 201980076048.1, dated Mar. 13, 2024.
Office Action dated May 23, 2024, from corresponding CN Application No. 201980076048.1, 16 pages.

* cited by examiner

ANODE ACTIVE MATERIAL FOR NON-AQUEOUS ELECTROLYTE SECONDARY BATTERY, ANODE, BATTERY, AND LAMINATE

CROSS REFERENCE TO RELATED APPLICATIONS

This application is the U.S. National Phase under 35 U.S.C. § 371 of International Application No. PCT/JP2019/040910, filed on Oct. 17, 2019, which claims the benefit of Japanese Application No. 2018-219613, filed on Nov. 22, 2018, the entire contents of each are hereby incorporated by reference.

TECHNICAL FIELD

The present invention relates to an anode active material for a non-aqueous electrolyte secondary battery, an anode, a battery, and a laminate.

BACKGROUND ART

Rechargeable secondary batteries have been already in practical use not only for small power sources in mobile phone applications, notebook personal computer applications, and the like but also for medium-sized and large-sized power sources in automotive applications, power storage applications, and the like.

Various attempts have been made to improve the cell characteristics of a non-aqueous electrolyte secondary battery. For example, Patent Document 1 describes an anode active material for a secondary battery, which is a porous aluminum alloy and contains at least one of silicon or tin.

Citation List

[Patent Document]
[Patent Document 1]
Japanese Unexamined Patent Application, First Publication No. 2011-228058

Summary of Invention

Technical Problem

There is still room for improvement in an anode active material for a non-aqueous electrolyte secondary battery in order to improve cell characteristics such as a charge/discharge efficiency.

The present invention has been made in view of the above circumstances, and an object thereof is to provide an anode active material for a non-aqueous electrolyte secondary battery having a high charge/discharge efficiency, an anode using the same, a battery using the same, and a laminate using the same.

Solution to Problem

The present invention includes the following [1] to [9].

[1] An anode active material for a non-aqueous electrolyte secondary battery, the anode active material including: an aluminum phase; and a non-aluminum metal phase dispersed in the aluminum phase, in which the non-aluminum metal phase is formed of a non-aluminum metal compound containing one or more selected from the group consisting of Si, Ge, Sn, Ag, Sb, Bi, In, and Mg, and an amount of the non-aluminum metal phase with respect to a total amount of the aluminum phase and the non-aluminum metal phase is 0.01 mass % or more and 8 mass % or less.

[2] An anode active material for a non-aqueous electrolyte secondary battery, the anode active material including: an aluminum phase; and a non-aluminum metal phase dispersed in the aluminum phase, in which the non-aluminum metal phase is formed of a non-aluminum metal compound containing one or more selected from the group consisting of Si, Ge, Sn, Ag, Sb, Bi, In, and Mg, and an amount of the non-aluminum metal phase with respect to a total amount of the aluminum phase and the non-aluminum metal phase is 0.005 mass % or more and 8 mass % or less.

[3] The anode active material for a non-aqueous electrolyte secondary battery according to [1] or [2], in which, in a binarized image obtained under the following conditions, a ratio of an area corresponding to the non-aluminum metal phase to a sum of an area corresponding to the aluminum phase and the area corresponding to the non-aluminum metal phase is 10% or less.

Image Acquisition Conditions

In a state where the anode active material for a non-aqueous electrolyte secondary battery is rolled into a foil having a thickness of 0.5 mm or less, the foil is cut perpendicular to a rolling direction, and a cut surface is etched with a 1.0 mass % sodium hydroxide aqueous solution.

A cross-sectional image of the cut surface is acquired, and the cross-sectional image is image-processed to obtain the binarized image.

[4] The anode active material for a non-aqueous electrolyte secondary battery according to any one of [1] to [3], in which the non-aluminum metal compound contains one or more selected from the group consisting of Si, Ge, Sn, Ag, Sb, Bi, and In.

[5] The anode active material for a non-aqueous electrolyte secondary battery according to any one of [1] to [4], in which the anode active material is a metal foil having a thickness of 5 µm or more and 200 µm or less.

[6] The anode active material for a non-aqueous electrolyte secondary battery according to any one of [1] to [4], in which the anode active material is a powder having an average particle size of 1 µm or more and 20 µm or less.

[7] An anode including: the anode active material for a non-aqueous electrolyte secondary battery according to any one of [1] to [6].

[8] A battery including: the anode according to [7].

[9] A laminate including: a thin layer and a substrate which are laminated, in which the thin layer is formed of the anode active material for a non-aqueous electrolyte secondary battery according to any one of [1] to [4], and the substrate is formed of a metal different from the anode active material for a non-aqueous electrolyte secondary battery.

Advantageous Effects of Invention

According to the present invention, it is possible to provide an anode active material for a non-aqueous electrolyte secondary battery having a high charge/discharge efficiency, an anode using the same, a battery using the same, and a laminate using the same.

DESCRIPTION OF EMBODIMENTS

Figure 1A:
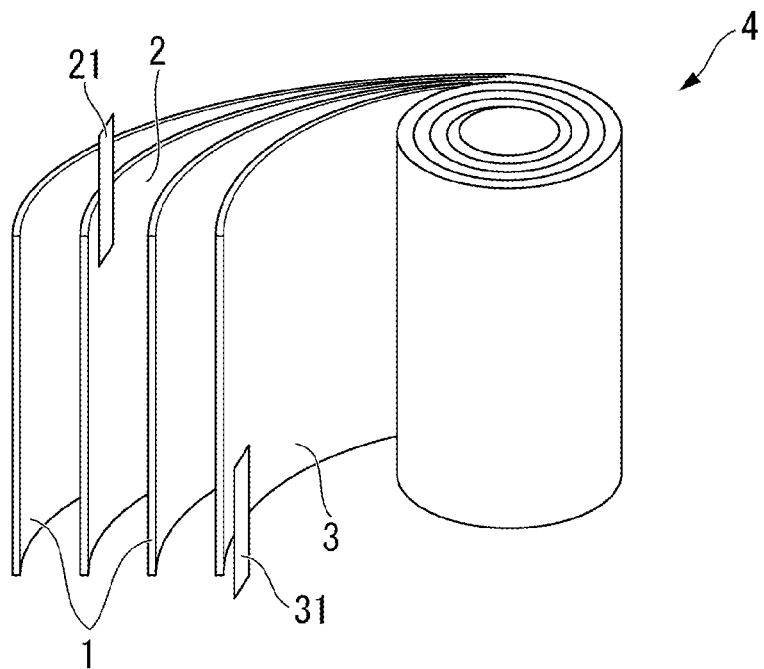
FIG. 1A is a schematic configuration view showing an example of a lithium-ion secondary battery.

<Anode Active Material for Non-aqueous Electrolyte Secondary Battery>

In an anode active material for a non-aqueous electrolyte secondary battery of the present embodiment, a non-aluminum metal phase is dispersed in an aluminum phase. The "anode active material for a non-aqueous electrolyte secondary battery" is sometimes abbreviated as "anode active material".

The non-aluminum metal phase is formed of a non-aluminum metal compound containing one or more selected from the group consisting of Si, Ge, Sn, Ag, Sb, Bi, In, and Mg.

In the present embodiment, the non-aluminum metal phase is preferably formed of a non-aluminum metal compound containing one or more selected from the group consisting of Si, Ge, Sn, Ag, Sb, Bi, and In.

In the present embodiment, the non-aluminum metal phase is preferably formed of non-aluminum metal compound particles.

In the following description, the "non-aluminum metal phase" is sometimes abbreviated as "metal phase".

In the following description, the "non-aluminum metal compound" is sometimes abbreviated as "metal compound".

The above-mentioned non-aluminum metal compound forming the non-aluminum metal phase has a very large occlusion amount of lithium. Therefore, the anode active material formed of the non-aluminum metal compound has a large volume expansion when lithium is inserted and a large volume contraction when lithium is desorbed, and is easily turned into fine particles. The tendency of the anode active material to be turned into fine particles causes a shortening of the cycle life.

In the anode active material of the present embodiment, the non-aluminum metal phase is dispersed in the aluminum phase. In other words, the non-aluminum metal compound is coated with aluminum, which can form an alloy with lithium. When the non-aluminum metal compound is coated with aluminum, the anode active material is less likely to be turned into fine particles during charging and discharging and can easily maintain an initial discharge capacity even in a case where charging and discharging are repeated. Therefore, a good discharge capacity retention ratio can be achieved.

In the present specification, the "discharge capacity retention ratio" means the ratio of a discharge capacity (numerator) to a charge capacity (denominator) during each charging or discharging.

In the present specification, "having a high charge/discharge efficiency" means that the discharge capacity retention ratio is high.

In the present embodiment, the amount of the non-aluminum metal phase with respect to the total amount of the aluminum phase and the non-aluminum metal phase is 0.01 mass % or more and 8 mass % or less.

In another aspect of the present embodiment, the amount of the non-aluminum metal phase with respect to the total amount of the aluminum phase and the non-aluminum metal phase is 0.005 mass % or more and 8 mass % or less.

The lower limit of the amount of the non-aluminum metal phase may be 0.006 mass %, preferably 0.02 mass %, more preferably 0.05 mass %, and particularly preferably 0.1 mass %.

The upper limit of the amount of the non-aluminum metal phase is preferably 7 mass %, more preferably 6 mass %, and particularly preferably 5 mass %.

The upper limit and the lower limit thereof can be randomly combined. Examples of the combination include 0.02 mass % or more and 7 mass % or less, 0.05 mass % or more and 6 mass % or less, and 0.1 mass % or more and 5 mass % or less.

In the present embodiment, when the amount of the non-aluminum metal phase is equal to or more than the lower limit, a metal or metal compound that can sufficiently contribute to the occlusion of lithium can be secured. When the amount of the non-aluminum metal phase is not more than the upper limit, the dispersed state of the non-aluminum metal phase in the aluminum phase tends to be good. In addition, when the amount of the non-aluminum metal phase is not more than the upper limit, softness that enables rolling can be maintained.

The metal phase may contain any metal other than Si, Ge, Sn, Ag, Sb, Bi, In, and Mg. Examples of the metal include Mn, Zn, and Ni.

The anode active material of the present embodiment is preferably an Al—Si binary alloy, an Al—Si—Mn ternary alloy, or an Al—Ge binary alloy.

As the aluminum forming the aluminum phase, aluminum having a purity of 99.9 mass % or more, high-purity aluminum having a purity of 99.99 mass % or more, or the like can be used.

In the anode active material of the present embodiment, in a binarized image obtained under the following image acquisition conditions, it is preferable that the ratio of an area corresponding to the metal phase to the sum of an area corresponding to the aluminum phase and the area corresponding to the metal phase is 10% or less.

Image Acquisition Conditions

The anode active material for a non-aqueous electrolyte secondary battery is rolled into a foil having a thickness of 0.5 mm. The foil is cut perpendicular to a rolling direction, and a cut surface is etched with a 1.0 mass % sodium hydroxide aqueous solution. The aluminum phase and the non-aluminum metal phase have different solubilities in sodium hydroxide. Therefore, by etching, a height difference between irregularities of a portion corresponding to the non-aluminum metal phase exposed on the cut surface and the aluminum phase is formed. Due to the difference in surface roughness, a clear contrast is shown during observation with a microscope, which will be described later.

Next, a cross-sectional image of the cut surface is acquired, and the cross-sectional image is image-processed to obtain a binarized image in which the aluminum phase and a crater portion corresponding to the metal phase are respectively converted. The area of the crater portion corresponds to the area of the metal phase.

The cross-sectional image can be acquired using, for example, a scanning electron microscope (SEM) or a metallurgical microscope.

The obtained SEM image and metallurgical microscope are taken into a computer, and binarization processing is performed with an intermediate value between the maximum brightness and the minimum brightness in the image using an image analysis software. By this processing, for example, a binarized image in which the aluminum phase is white and the portion corresponding to the metal phase is black can be obtained. As the image analysis software, Image J, Photoshop, Image Pro Plus, or the like can be appropriately selected.

In the binarized image, the ratio of the area corresponding to the metal phase to the sum of the area corresponding to the aluminum phase and the area corresponding to the metal phase is preferably 10% or less, more preferably 6% or less, and particularly preferably 3% or less.

When the ratio of the area corresponding to the metal phase is not more than the upper limit, the metal compound is sufficiently coated with aluminum, and turning into fine particles during charging and discharging can be prevented.

(Dispersed State)

In the anode active material for a non-aqueous electrolyte secondary battery of the present embodiment, the non-aluminum metal phase is dispersed in the aluminum phase. Here, "the non-aluminum metal phase is dispersed in the aluminum phase" means a state in which non-aluminum metal compound particles are present in an aluminum matrix.

For example, it is preferable that the non-aluminum metal compound particles observed in a case of observing the cross section of a foil-shaped anode active material having a thickness of 0.5 mm satisfy both the following conditions (1) and (2). Condition (1): The number density of non-aluminum metal compound particles having a particle size of 0.1 $\mu m^2$ or more and less than 100 $\mu m^2$ is 1000 particles/$mm^2$ or less.

Condition (2): The number density of non-aluminum metal compound particles having a particle size of 100 $\mu m^2$ or more is 25 particles/$mm^2$ or less.

In the present embodiment, regarding the particle size of the non-aluminum metal compound particles, for example, the distance between parallel lines which are drawn in a certain direction (diameter in the direction) on a projected image of the non-aluminum metal compound particles from the SEM image photograph or metallurgical microscope is measured as the particle size of the non-aluminum metal compound particle.

In addition, the "number density" means the density of the number of non-aluminum metal compound particles present per unit area.

<Method of Manufacturing Anode Active Material>

A method of manufacturing the anode active material of the present embodiment preferably includes an alloy casting step and a rolling step.

(Casting Step)

In a case where casting is performed, for example, a predetermined amount of the metal forming the non-aluminum metal phase is added to high-purity aluminum and melted at about 680° C. or higher and 800° C. or lower to obtain a molten aluminum-metal alloy.

The metal forming the non-aluminum metal phase is one or more selected from the group consisting of Si, Ge, Sn, Ag, Sb, Bi, In, and Mg. Examples of the metal include high-purity silicon having a purity of 99.999 mass % or more.

The molten alloy is preferably subjected to a treatment of removing gas and non-metallic inclusions for cleaning (for example, a vacuum treatment of molten aluminum).

The vacuum treatment is performed, for example, at 700° C. or higher and 800° C. or lower for 1 hour or longer and 10 hours or shorter under the condition of a degree of vacuum of 0.1 Pa or more and 100 Pa or less.

As a treatment for cleaning the molten alloy, a treatment of blowing a flux, an inert gas, or chlorine gas can also be used. The molten alloy cleaned by the vacuum treatment or the like is usually cast in a mold to obtain an ingot.

As the mold, one made of iron or graphite heated to 50° C. or higher and 200° C. or lower is used. The anode active material of the present embodiment can be cast by a method of pouring a molten alloy at 680° C. or higher and 800° C. or lower into a mold. Alternatively, an ingot can also be obtained by semi-continuous casting which is generally used.

(Rolling Step)

The obtained alloy ingot can be directly cut and used as a cell member. In a case where the ingot is rolled, extruded, or forged into a sheet material or a mold material, the ingot can be easily used as a clad material.

In the rolling of the ingot, for example, hot rolling and cold rolling are performed to process the ingot into a sheet material or foil shape. As for the temperature condition under which the hot rolling is performed, for example, the temperature of an aluminum ingot or an aluminum alloy ingot is set to 350° C. or higher and 450° C. or lower.

In the rolling, the material is repeatedly passed between a pair of rolling rolls to be finished into a target sheet thickness. Passing between the pair of rolling rolls is referred to as a "pass".

A working ratio r per pass (one pass) is a sheet thickness reduction ratio when passing through the rolling rolls once, and is calculated by the following expression.

$$r=(T_0-T)/T_0\times100$$

($T_0$: thickness before passing through the rolling rolls, and T: thickness after passing through the rolling rolls)

In the present embodiment, it is preferable to repeat the rolling until the aluminum ingot or the aluminum alloy ingot reaches the target thickness under the condition that the working ratio r is 2% or more and 20% or less.

After the hot rolling, an intermediate annealing treatment may be performed before the cold rolling.

In the intermediate annealing treatment, for example, the hot-rolled aluminum ingot or aluminum alloy ingot may be heated to 350° C. or higher and 450° C. or lower, and allowed to cool immediately after the temperature rise.

Alternatively, the aluminum ingot or the aluminum alloy ingot may be allowed to cool after being held for about 1 hour or longer and 5 hours or shorter.

By this treatment, the material of the aluminum ingot or the aluminum alloy ingot is softened, and a state in which cold rolling is easy is obtained.

The cold rolling is repeatedly performed, for example, at a temperature lower than the recrystallization temperature of aluminum, usually from room temperature to 80° C. or lower, under the condition of a working ratio r of 1% or more and 10% or less for a die of one pass, until the aluminum ingot has a desired thickness. The temperature of the cold rolling may be 80° C. or lower from room temperature.

In the present embodiment, it is preferable to perform a heat treatment step after the cold rolling. By adjusting the temperature and time of the heat treatment, physical properties such as strength and conductivity can be adjusted within a desired range.

The heat treatment step can be performed in an air atmosphere or an oxygen atmosphere. Alternatively, the heat treatment step may be performed in a nitrogen atmosphere while controlling the oxygen concentration to 0.1% or more and 3% or less. In the present embodiment, the air atmosphere is preferable, and a dry air is more preferable.

For example, the heat treatment temperature of the heat treatment step is preferably 200° C. or higher and 600° C. or lower, more preferably 250° C. or higher and 550° C. or lower, and particularly preferably 350° C. or higher and 500° C. or lower.

The heat treatment time of the heat treatment step is preferably 60 minutes or longer and 1200 minutes or shorter, more preferably 120 minutes or longer and 600 minutes or shorter, and particularly preferably 180 minutes or longer and 480 minutes or shorter.

There are cases where various physical properties are adjusted by, in addition to softening of the work-hardened sheet material by the heat treatment step, controlling the crystal structure.

In the present embodiment, the anode active material is preferably a metal foil.

The thickness of the metal foil is preferably 5 µm or more, more preferably 6 µm or more, and even more preferably 7 µm or more. In addition, the thickness is preferably 200 µm or less, more preferably 190 µm or less, and even more preferably 180 µm or less. The upper limit and the lower limit thereof can be randomly combined. In the present embodiment, the thickness is preferably 5 µm or more and 200 µm or less.

In the present embodiment, the thickness of the metal foil may be measured using a thickness gauge or a caliper.

In the present embodiment, the anode active material may be a powder having an average particle size of 1 µm or more and 20 µm or less. This can be obtained by crushing the ingot obtained by the above casting step.

The crushing method is not particularly limited, and a method using a ball mill, a bead mill, or the like and a method using a jet mill or the like may be used.

A method of manufacturing the powder is not particularly limited, and for example, the powder can be manufactured by an atomizing method in which molten aluminum is ejected from a nozzle.

Aluminum Purification Method

In a case of using high-purity aluminum in the present embodiment, examples of a refining method for purifying aluminum include a segregation method and a three-layer electrolytic method.

The segregation method is a purification method utilizing the segregation phenomenon during solidification of molten aluminum, and a plurality of methods have been put into practical use. As one form of the segregation method, there is a method of pouring molten aluminum into a container, and allowing refined aluminum to solidify from the bottom portion while heating and stirring the molten aluminum at the upper portion while rotating the container. By the segregation method, high-purity aluminum having a purity of 99.99 mass % or more can be obtained.

The three-layer electrolytic method is an electrolytic method for purifying aluminum. As one form of the three-layer electrolytic method, first, aluminum or the like having a relatively low purity (for example, a grade of a purity of 99.9 mass % or less in JIS-H2102) is put into an Al—Cu alloy layer. Thereafter, in the method, with an anode in a molten state, an electrolytic bath containing, for example, aluminum fluoride and barium fluoride is disposed thereon, and high-purity aluminum is deposited on a cathode.

High-purity aluminum having a purity of 99.999 mass % or more can be obtained by the three-layer electrolytic method.

The method of purifying aluminum is not limited to the segregation method and the three-layer electrolytic method, and other known methods such as a zone melting refining method and an ultra-high vacuum melting method may be used.

<Anode and Battery>

Next, an anode using the anode active material of the present invention as the anode active material of a battery and a secondary battery having the anode will be described while describing the configuration of the battery.

Hereinafter, a lithium secondary battery using a lithium positive electrode active material for the positive electrode will be described as an example.

An example of the lithium secondary battery of the present embodiment includes a positive electrode, an anode, a separator interposed between the positive electrode and the anode, and an electrolytic solution disposed between the positive electrode and the anode.

Figure 1B:
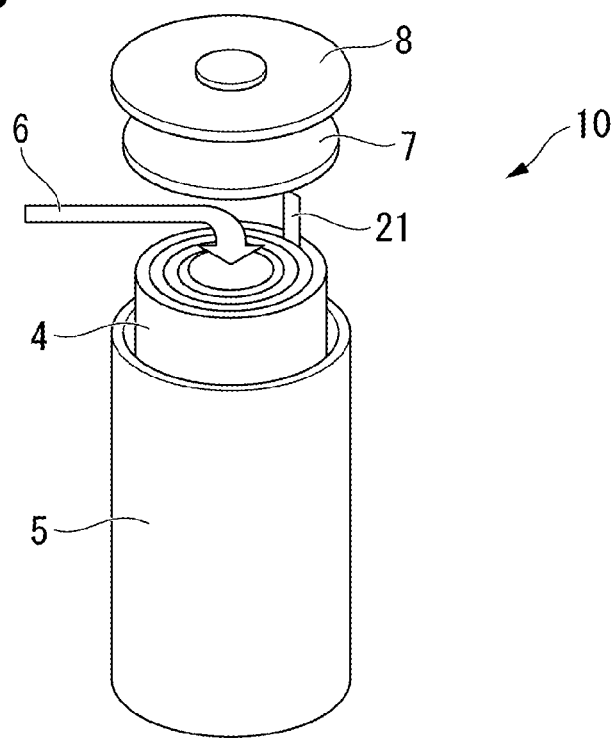
FIG. 1B is a schematic configuration view showing an example of the lithium-ion secondary battery.

FIGS. 1A and 1B are schematic views showing an example of the lithium secondary battery of the present embodiment. A cylindrical lithium secondary battery of the present embodiment is manufactured as follows.

First, as shown in FIG. 1A, a pair of separators 1 having a strip shape, a strip-shaped positive electrode 2 having a positive electrode lead 21 at one end, and a strip-shaped anode 3 having an anode lead 31 at one end are stacked in order of the separator 1, the positive electrode 2, the separator 1, and the anode 3 and are wound to form an electrode group 4.

Next, as shown in FIG. 1B, the electrode group 4 and an insulator (not shown) are accommodated in a battery can 5, the can bottom is then sealed, the electrode group 4 is impregnated with an electrolytic solution 6, and an electrolyte is disposed between the positive electrode 2 and the anode 3. Furthermore, the upper portion of the battery can is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086 which is a standard for a battery defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, an anode, and a separator is repeatedly stacked. A so-called coin type battery, a button type battery, and a paper type (or sheet type) battery are exemplary examples of the stacked type lithium secondary battery.

Hereinafter, each configuration will be described in order.

(Positive Electrode)

The positive electrode of the present embodiment can be manufactured by first adjusting a positive electrode mixture containing a positive electrode active material, a conductive material, and a binder, and causing a positive electrode current collector to hold the positive electrode mixture.

(Positive Electrode Active Material)

As the positive electrode active material, a material containing a lithium-containing compound or another metal compound can be used. Examples of the lithium-containing compound include a lithium cobalt composite oxide having a layered structure, a lithium nickel composite oxide having a layered structure, and a lithium manganese composite oxide having a spinel structure.

Examples of the other metal compounds include oxides such as titanium oxide, vanadium oxide, and manganese dioxide, and sulfides such as titanium sulfide and molybdenum sulfide.

(Conductive Material)

A carbon material can be used as the conductive material included in the positive electrode of the present embodiment. As the carbon material, there are graphite powder, carbon black (for example, acetylene black), a fibrous carbon material, and the like. Carbon black is fine particles and has a large surface area. Therefore, the addition of a small amount of carbon black to the positive electrode mixture increases the conductivity inside the positive electrode and thus improves the charge/discharge efficiency and output characteristics. However, when the carbon black is added too much, both the binding force between the positive electrode mixture and the positive electrode current collector by the binder and the binding force inside the positive electrode mixture decrease, which causes an increase in internal resistance.

The proportion of the conductive material in the positive electrode mixture is preferably 5 parts by mass or more and 20 parts by mass or less with respect to 100 parts by mass of the positive electrode active material. In a case of using a fibrous carbon material such as graphitized carbon fiber or carbon nanotube as the conductive material, it is possible to reduce the proportion of the conductive material in the positive electrode mixture.

(Binder)

A thermoplastic resin can be used as the binder included in the positive electrode of the present embodiment.

As the thermoplastic resin, fluorine resins such as polyvinylidene fluoride (hereinafter, sometimes indicated as PVdF), polytetrafluoroethylene (hereinafter, sometimes indicated as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the entire positive electrode mixture to 1 mass % or more and 10 mass % or less and the ratio of the polyolefin resin to 0.1 mass % or more and 2 mass % or less, a positive electrode mixture having both high adhesion to the positive electrode current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, as the current collector, from the viewpoint of easy processing and low cost, it is preferable to use Al as the forming material and process Al into a thin film.

The positive electrode current collector may have the same component as Al of the anode.

As a method of causing the positive electrode current collector to hold the positive electrode mixture, a method of press-forming the positive electrode mixture on the positive electrode current collector can be adopted. In addition, the positive electrode mixture may be held by the positive electrode current collector by forming the positive electrode mixture into a paste using an organic solvent, applying the obtained paste of the positive electrode mixture to at least one side of the positive electrode current collector, drying the paste, and pressing the paste to be fixed.

In a case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes indicated as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method.

The positive electrode can be manufactured by the method mentioned above.

(Anode)

The anode active material of the present embodiment is used for the anode included in the lithium secondary battery of the present embodiment.

(Anode Current Collector)

As a current collector included in the anode, in a case where the anode is a metal foil, there are cases where excess aluminum that does not participate in charging and discharging acts as the current collector. In this case, a separate current collector may not be required.

In a case where the current collector is used, as the anode current collector, a strip-shaped member formed of a metal material, such as Cu, Ni, or stainless steel, as the forming material can be adopted. Among these, as the material of the current collector, it is preferable to use Cu as the forming material and process Cu into a thin film because Cu is less likely to form an alloy with lithium and can be easily processed.

In a case where the anode active material is a powder, as a method of causing the anode current collector to hold an anode mixture, similarly to the case of the positive electrode, a method of press-forming an anode mixture containing the anode active material and a binder, or a method of forming the anode mixture into a paste using a solvent or the like, applying the paste onto the anode current collector, drying the paste, and pressing the paste to be compressed can be adopted.

A conductive material may further be added to the anode mixture. As the conductive material, those mentioned as the conductive material of the positive electrode material can be used.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer can be used. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during battery use (during charging and discharging).

In addition, the porosity of the separator is preferably 30 vol % or more and 80 vol % or less, and more preferably 40 vol % or more and 70 vol % or less. The separator may be a laminate of separators having different porosities.

(Electrolytic Solution)

The electrolytic solution included in the lithium secondary battery of the present embodiment contains an electrolyte and an organic solvent.

As the electrolyte contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato) borate), LiFSI (here, FSI refers to bis(fluorosulfonyl)imide), lower aliphatic carboxylic acid lithium salts, and $LiAlCl_4$ can be adopted, and a mixture of two or more thereof may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent contained in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has a wide operating temperature range, is less likely to deteriorate even when charging or discharging is performed at a high current rate, and is less likely to deteriorate even during a long-term use.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolytic solution is held in a polymer compound can also be used. Inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may also be used. By using these solid electrolytes, the safety of the lithium secondary battery may be further enhanced.

In addition, in a case of using a solid electrolyte in the battery of the present embodiment, there may be cases where the solid electrolyte acts as the separator, and in such a case, the separator may not be required.

<Laminate>

The present embodiment is a laminate in which a thin layer and a substrate are laminated.

The thin layer is formed of the anode active material for a non-aqueous electrolyte secondary battery of the present embodiment. The substrate is made of a metal different from the metal forming the thin layer.

The laminate of the present embodiment includes the thin layer on one side or both sides of the substrate. The metal forming the thin layer is the anode active material for a non-aqueous electrolyte secondary battery of the present embodiment described above.

As the metal forming the substrate, a metal that is not alloyed with aluminum or lithium is used. Examples of such a metal include copper, nickel, and stainless steel.

As the metal forming the substrate, a metal that is less likely to be alloyed with aluminum or lithium can also be used.

The laminate of the present embodiment can be manufactured by stacking the thin layer and the substrate, and rolling and joining the resultant while applying a pressure for diffusion annealing. The temperature of the diffusion annealing may be, for example, 150° C. or higher and 550° C. or lower. Cold working may be performed after the rolling and joining.

EXAMPLES

Next, the present invention will be described in more detail with reference to examples.

Example 1

[Production of Anode]

A silicon-aluminum alloy used in Example 1 was manufactured by the following method.

High-purity aluminum (purity: 99.99 mass % or more) and silicon (purity: 99.999 mass % or more) manufactured by Kojundo Chemical Laboratory Co., Ltd. were heated to 760° C. and held, whereby a molten Al—Si alloy having a silicon content of 1.0 mass % was obtained.

Next, the molten alloy was cleaned by being held at a temperature of 740° C. for 2 hours under the condition of a degree of vacuum of 50 Pa.

The molten alloy was cast in a cast iron mold (22 mm×150 mm×200 mm) dried at 150° C. to obtain an ingot.

Rolling was performed under the following conditions. After both surfaces of the ingot were subjected to scalping by 2 mm, cold rolling was performed from a thickness of 18 mm at a working ratio of 99.6%. The thickness of the obtained rolled material was 100 μm.

A high-purity aluminum-silicon alloy foil (thickness 100 μm) having an aluminum purity of 99.999% and a silicon content of 1.0 mass % was cut into a disk shape of φ14 mm to manufacture an anode.

[Production of Counter Electrode]

A lithium foil having a purity of 99.9% (thickness 300 μm: manufactured by Honjo Chemical) was cut into a disk shape of q16 mm to manufacture a counter electrode.

[Production of Electrolytic Solution]

In a mixed solvent prepared by mixing ethylene carbonate (EC) and diethyl carbonate (DEC) at EC:DEC =30:70 (volume ratio), $LiPF_6$ was dissolved to 1 mol/liter to produce an electrolytic solution.

[Production of Non-aqueous Electrolyte Secondary Battery]

A polyethylene porous separator was disposed between the anode and the counter electrode and accommodated in a battery case (standard 2032), the above electrolytic solution was injected, and the battery case was sealed, whereby a coin type (half cell) non-aqueous electrolyte secondary battery having a diameter of 20 mm and a thickness of 3.2 mm was produced.

[Charge/Discharge Evaluation: Initial Charge/Discharge]

The separator was sufficiently impregnated with the electrolytic solution by allowing the coin type non-aqueous electrolyte secondary battery to stand at room temperature for 10 hours.

Next, initial charging and discharging were performed by performing constant current charging (occlusion of Li in Al) to 0.005 V at 0.5 mA at room temperature, then performing constant current constant voltage charging for 5 hours for constant voltage charging to 0.005 V, and thereafter performing constant current discharging for discharging (release of Li from Al) to 2.0 V at 0.5 mA.

[Charge/Discharge Evaluation: Charge/Discharge Efficiency at Tenth Cycle and Twentieth Cycle]

After the initial charging and discharging, charging at 0.5 mA and discharging at 0.5 mA were repeated under the same conditions as in the initial charging and discharging.

The life was evaluated by ten and twenty cycle tests, and the discharge capacity retention ratio was calculated by the following expression.

Discharge capacity retention ratio (%) after ten cycles =discharge capacity at tenth cycle/charge capacity at tenth cycle ×100 Discharge capacity retention ratio (%) after twenty cycles =discharge capacity at twentieth cycle/charge capacity at twentieth cycle ×100

In Example 1, the discharge capacity retention ratio calculated by the above method was 99.5% at the tenth cycle and 100% after the twentieth cycle.

[Observation of Metal Phase and Binarization Processing] · Sample Production

An aluminum plate having a thickness of 18 mm obtained in Example 1 was rolled into a foil having a thickness of 0.5 mm.

The foil was cut perpendicular to the rolling direction. The cut surface was polished with emery paper, buffed, and electropolished for 20 seconds. Thereafter, silicon forming the metal phase exposed on the cut surface was removed by etching with a 1.0 mass % sodium hydroxide aqueous solution.

Next, the obtained cross section was observed using an optical microscope (Nikon EPIPHOT 300) at a magnification of 200 times.

Using image analysis software (Image-Pro Plus), the obtained image was binarized for simple binarization of the aluminum phase to white and the metal phase to black.

As a result, the ratio of the area corresponding to the metal phase was 4%.

The number density of non-aluminum metal compound particles having a particle size of 0.1 $μm^2$ or more and less than 100 $μm^2$ was 318 particles/$mm^2$.

Furthermore, the number density of non-aluminum metal compound particles having a particle size of 100 $μm^2$ or more was 9 particles/$mm^2$.

Comparative Example 1

A coin type (half cell) non-aqueous electrolyte secondary battery was produced in the same manner as in Example 1 except that an anode used was an aluminum foil (thickness 100 μm) having a purity of 99.99%, and evaluated.

In Comparative Example 1, the discharge capacity retention ratio calculated by the above method was 92.8% at the tenth cycle and 91.2% at the twentieth cycle.

Comparative Example 2

A coin type (half cell) non-aqueous electrolyte secondary battery was produced in the same manner as in Example 1 except that an anode used was an aluminum foil (thickness 100 μm) having a purity of 99.99% and a heat treatment was performed at 340° C. for 7 hours after cold rolling, and evaluated.

In Comparative Example 2, the discharge capacity retention ratio calculated by the above method was 95.4% at the tenth cycle and 93.2% at the twentieth cycle.

Example 2

A coin type (half cell) non-aqueous electrolyte secondary battery was produced in the same manner as in Example 1 except that a molten Al—Si alloy having a silicon content of 1.0 mass % was obtained and a heat treatment was performed at 340° C. for 7 hours after cold rolling, and evaluated.

In Example 2, the discharge capacity retention ratio calculated by the above method was 97.6% at the tenth cycle and 97.5% at the twentieth cycle. The ratio of the area obtained by the simple binarization corresponding to the metal phase was 3.4%.

Example 3

A coin type (half cell) non-aqueous electrolyte secondary battery was produced in the same manner as in Example 1 except that a molten Al—Si alloy having a silicon content of 0.3 mass % was obtained, and evaluated.

In Example 3, the discharge capacity retention ratio calculated by the above method was 98.3% at the tenth cycle and 99.2% at the twentieth cycle. The ratio of the area obtained by the simple binarization corresponding to the metal phase was 0.0039%.

Example 4

A coin type (half cell) non-aqueous electrolyte secondary battery was produced in the same manner as in Example 3 except that a heat treatment was performed at 340° C. for 7 hours after cold rolling, and evaluated.

In Example 4, the discharge capacity retention ratio calculated by the above method was 97.1% at the tenth cycle and 96.8% at the twentieth cycle. The ratio of the area obtained by the simple binarization corresponding to the metal phase was 0.0125%.

Example 5

High-purity aluminum (purity: 99.99 mass % or more), and silicon (purity: 99.999 mass % or more) and manganese (Al—Mn for casting, purity 99.9% or more) manufactured by Kojundo Chemical Laboratory Co., Ltd. were heated to 760° C. and held, whereby a molten Al—Si—Mn alloy having a silicon content of 0.3 mass % and a manganese content of 0.6 mass % was obtained. The subsequent operations were performed in the same manner as in Example 1, whereby a coin type (half cell) non-aqueous electrolyte secondary battery was produced, and evaluated.

In Example 5, the discharge capacity retention ratio calculated by the above method was 99.8% at the tenth cycle and 100% after the twentieth cycle. The ratio of the area corresponding to the metal phase was 0.0275%.

Example 6

A coin type (half cell) non-aqueous electrolyte secondary battery was produced in the same manner as in Example 1 except that a molten Al—Si—Mn alloy having a silicon content of 0.3 mass % and a manganese content of 0.6 mass % was obtained and a heat treatment was performed at 340° C. for 7 hours after cold rolling, and evaluated.

In Example 6, the discharge capacity retention ratio calculated by the above method was 100% at the tenth cycle and 97.6% at the twentieth cycle. The ratio of the area corresponding to the metal phase was 1%.

Example 7

A coin type (half cell) non-aqueous electrolyte secondary battery was produced in the same manner as in Example 1 except that a molten Al—Ge alloy having a germanium content of 70 ppm (0.007 mass %) was obtained, and evaluated.

In Example 7, the discharge capacity retention ratio calculated by the above method was 97.7% at the tenth cycle and 97.5% at the twentieth cycle. The ratio of the area corresponding to the metal phase was 0.51%.

Example 8

A coin type (half cell) non-aqueous electrolyte secondary battery was produced in the same manner as in Example 1 except that a molten Al—Ge alloy having a germanium content of 70 ppm (0.007 mass %) was obtained and a heat treatment was performed at 340° C. for 7 hours after cold rolling, and evaluated.

In Example 8, the discharge capacity retention ratio calculated by the above method was 95.9% at the tenth cycle and 96.5% at the twentieth cycle. The ratio of the area corresponding to the metal phase was 0.35%.

Example 9

A coin type (half cell) non-aqueous electrolyte secondary battery was produced in the same manner as in Example 1 except that a molten Al—Ge alloy having a germanium content of 200 ppm (0.02 mass %) was obtained, and evaluated.

In Example 9, the discharge capacity retention ratio calculated by the above method was 97.6% at the tenth cycle and 97.3% at the twentieth cycle. The ratio of the area corresponding to the metal phase was 0.54%.

Example 10

A coin type (half cell) non-aqueous electrolyte secondary battery was produced in the same manner as in Example 1 except that a molten Al—Ge alloy having a germanium content of 200 ppm (0.02 mass %) was obtained and a heat treatment was performed at 340° C. for 7 hours after cold rolling, and evaluated.

In Example 10, the discharge capacity retention ratio calculated by the above method was 96.2% at the tenth cycle and 96.4% at the twentieth cycle. The ratio of the area corresponding to the metal phase was 0.44%.

Example 11

A coin type (half cell) non-aqueous electrolyte secondary battery was produced in the same manner as in Example 1 except that a molten Al—Ge alloy having a germanium content of 930 ppm (0.093 mass %) was obtained, and evaluated.

In Example 11, the discharge capacity retention ratio calculated by the above method was 97.7% at the tenth cycle and 97.7% at the twentieth cycle. The ratio of the area corresponding to the metal phase was 1.8%.

Example 12

A coin type (half cell) non-aqueous electrolyte secondary battery was produced in the same manner as in Example 1 except that a molten Al—Ge alloy having a germanium content of 930 ppm (0.093 mass %) was obtained and a heat treatment was performed at 340° C. for 7 hours after cold rolling, and evaluated.

In Example 12, the discharge capacity retention ratio calculated by the above method was 96.3% at the tenth cycle and 97.2% at the twentieth cycle. The ratio of the area corresponding to the metal phase was 0.95%.

Example 13

A coin type (half cell) non-aqueous electrolyte secondary battery was produced in the same manner as in Example 1 except that a molten alloy of high-purity aluminum having an aluminum purity of 99.999 mass % or more and germanium (the germanium content is 200 ppm (0.02 mass %)) was obtained, and evaluated.

In Example 13, the discharge capacity retention ratio calculated by the above method was 96.1% at the tenth cycle and 97.0% at the twentieth cycle. The ratio of the area corresponding to the metal phase was 2.0%.

Example 14

A coin type (half cell) non-aqueous electrolyte secondary battery was produced in the same manner as in Example 1 except that a molten alloy of high-purity aluminum having an aluminum purity of 99.999 mass % or more and germanium (the germanium content is 200 ppm (0.02 mass %)) was obtained and a heat treatment was performed at 340° C. for 7 hours after cold rolling, and evaluated.

In Example 14, the discharge capacity retention ratio calculated by the above method was 95.7% at the tenth cycle and 96.8% at the twentieth cycle. The ratio of the area corresponding to the metal phase was 1.4%.

Table 1 below summarizes Examples 1 to 6 and Comparative Examples 1 and 2.

Table 2 below summarizes Examples 7 to 12.

Table 3 below summarizes Examples 13 to 14.

TABLE 1

| | Non-aluminum metal phase | Heat treatment | Ratio of area corresponding to non-aluminum metal phase | Discharge capacity retention ratio (%) At tenth cycle | Discharge capacity retention ratio (%) At twentieth cycle |
|---|---|---|---|---|---|
| Example 1 | Si 1.0% | Absent | 4% | 99.5 | 100 |
| Example 2 | Si 1.0% | Present | 3.4% | 97.6 | 97.5 |
| Example 3 | Si 0.3% | Absent | 0.0039% | 98.3 | 99.2 |
| Example 4 | Si 0.3% | Present | 0.0125% | 97.1 | 96.8 |
| Example 5 | Si 0.3%, Mn 0.6% | Absent | 0.0275% | 99.8 | 100 |
| Example 6 | Si 0.3%, Mn 0.6% | Present | 1% | 100 | 97.6 |
| Comparative Example 1 | Absent | Absent | Absent | 92.8 | 91.2 |
| Comparative Example 2 | Absent | Present | Absent | 95.4 | 93.2 |

TABLE 2

| | Non-aluminum metal phase | Heat treatment | Ratio of area corresponding to non-aluminum metal phase | Discharge capacity retention ratio (%) At tenth cycle | Discharge capacity retention ratio (%) At twentieth cycle |
|---|---|---|---|---|---|
| Example 7 | Ge 70 ppm (0.007 mass %) | Absent | 0.51 | 97.7 | 97.5 |
| Example 8 | Ge 70 ppm (0.007 mass %) | Present | 0.35 | 95.9 | 96.5 |
| Example 9 | Ge 200 ppm (0.02 mass %) | Absent | 0.54 | 97.6 | 97.3 |
| Example 10 | Ge 200 ppm (0.02 mass %) | Present | 0.44 | 96.2 | 96.4 |
| Example 11 | Ge 930 ppm (0.093 mass %) | Absent | 1.8 | 97.7 | 97.7 |
| Example 12 | Ge 930 ppm (0.093 mass %) | Present | 0.95 | 96.3 | 97.2 |

TABLE 3

| | Non-aluminum metal phase | Heat treatment | Ratio of area corresponding to non-aluminum metal phase | Discharge capacity retention ratio (%) At tenth cycle | Discharge capacity retention ratio (%) At twentieth cycle |
|---|---|---|---|---|---|
| Example 13 | Ge 200 ppm (0.02 mass %) | Absent | 2.0 | 96.1 | 97.0 |
| Example 14 | Ge 200 ppm (0.02 mass %) | Present | 1.4 | 95.7 | 96.8 |

As shown in the above results, the examples to which the present invention was applied had a higher charge/discharge efficiency than the comparative examples. In the above examples, silicon was used as the non-aluminum metal. Since Ge and Sn are in the same group as silicon, it can be inferred that the same effect as described above can be exhibited even if Ge or Sn is used as the non-aluminum metal.

Similarly, since Mg, Ag, Sb, Bi, or In also has a larger volume change due to charging (Li occlusion) than Al, it can be inferred that the same effect as described above can be exhibited even if Mg, Ag, Sb, Bi, or In is used as the non-aluminum metal.

In particular, Sb, Bi, or In has a higher lithium occlusion potential than Al. Therefore, a Li alloy can be easily formed by charging (Li occlusion), and it can be inferred that the effect is further exhibited in a case where Sb, Bi, or In is used as the non-aluminum metal.

<<Manufacturing Example 1>>

A coin type (half cell) non-aqueous electrolyte secondary battery was produced in the same manner as in Example 1 except that a molten Al—Si—Mn alloy having a silicon content of 8 mass % and a manganese content of 0.6 mass % was obtained and a heat treatment was performed at 340° C. for 7 hours after cold rolling, and evaluated.

Even in a case where the silicon content was set to 8 mass %, rolling could be performed without any manufacturing problems, and a non-aqueous electrolyte secondary battery could be manufactured.

REFERENCE SIGNS LIST

1: Separator
2: Positive electrode
3: Anode
4: Electrode group
5: Battery can
6: Electrolytic solution
7: Top insulator
8: Sealing body
10: Battery
21: Positive electrode lead
31: Anode lead

What is claimed is:

1. An anode active material for a non-aqueous electrolyte secondary battery, the anode active material comprising:
   an aluminum phase; and
   a non-aluminum metal phase dispersed in the aluminum phase,
   wherein the non-aluminum metal phase is formed of a non-aluminum metal compound containing one or more selected from the group consisting of Si, Ge, Sn, Ag, Sb, In, and Mg,
   an amount of the non-aluminum metal phase with respect to a total amount of the aluminum phase and the non-aluminum metal phase is 0.01 mass % or more and 8 mass % or less, and
   the non-aluminum metal phase observed in a case of observing a cross section of a foil-shaped anode active material having a thickness of 0.5 mm satisfies the following conditions (1) and (2),
   condition (1): a number density of non-aluminum metal phase having a particle size of 0.1 $\mu m^2$ or more and less than 100 $\mu m^2$ is 1000 particles/$mm^2$ or less, condition (2): a number density of non-aluminum metal phase having a particle size of 100 $\mu m^2$ or more is 25 particles/$mm^2$ or less.

2. The anode active material for a non-aqueous electrolyte secondary battery according to claim 1,
   wherein, in a binarized image obtained under image acquisition conditions set forth below, a ratio of an area corresponding to the non-aluminum metal phase to a sum of an area corresponding to the aluminum phase and the area corresponding to the non-aluminum metal phase is 10% or less, the image acquisition conditions:
the anode active material for a non-aqueous electrolyte secondary battery is rolled into a foil having a thickness of 0.5 mm;
the foil is cut perpendicular to a rolling direction, and a cut surface is etched with a 1.0 mass % sodium hydroxide aqueous solution; and
a cross-sectional image of the cut surface is acquired, and the cross-sectional image is image-processed to obtain the binarized image.

3. The anode active material for a non-aqueous electrolyte secondary battery according to claim 1,
wherein the non-aluminum metal compound contains one or more selected from the group consisting of Si, Ge, Sn, Ag, Sb, and In.

4. The anode active material for a non-aqueous electrolyte secondary battery according to claim 1,
wherein the anode active material is a metal foil having a thickness of 5 μm or more and 200 μm or less.

5. The anode active material for a non-aqueous electrolyte secondary battery according to claim 1,
wherein the anode active material is a powder having an average particle size of 1 μm or more and 20 μm or less.

6. An anode comprising:
the anode active material for a non-aqueous electrolyte secondary battery according to claim 1.

7. A battery comprising:
the anode according to claim 6.

8. A laminate comprising:
a thin layer and a substrate which are laminated,
wherein the thin layer is formed of the anode active material for a non-aqueous electrolyte secondary battery according to claim 1, and
the substrate is formed of a metal different from the anode active material for a non-aqueous electrolyte secondary battery.

9. An anode active material for a non-aqueous electrolyte secondary battery, the anode active material comprising:
an aluminum phase; and
a non-aluminum metal phase dispersed in the aluminum phase,
wherein the non-aluminum metal phase is formed of a non-aluminum metal compound containing one or more selected from the group consisting of Si, Ge, Sn, Ag, Sb, In, and Mg,
an amount of the non-aluminum metal phase with respect to a total amount of the aluminum phase and the non-aluminum metal phase is 0.005 mass % or more and 8 mass % or less, and
the non-aluminum metal phase observed in a case of observing a cross section of a foil-shaped anode active material having a thickness of 0.5 mm satisfies the following conditions (1) and (2),
condition (1): a number density of non-aluminum metal phase having a particle size of 0.1 μm$^2$ or more and less than 100 μm$^2$ is 1000 particles/mm$^2$ or less,
condition (2): a number density of non-aluminum metal phase having a particle size of 100 μm$^2$ or more is 25 particles/mm$^2$ or less.

10. The anode active material for a non-aqueous electrolyte secondary battery according to claim 9,
wherein, in a binarized image obtained under image acquisition conditions set forth below, a ratio of an area corresponding to the non-aluminum metal phase to a sum of an area corresponding to the aluminum phase and the area corresponding to the non-aluminum metal phase is 10% or less,
the image acquisition conditions:
the anode active material for a non-aqueous electrolyte secondary battery is rolled into a foil having a thickness of 0.5 mm;
the foil is cut perpendicular to a rolling direction, and a cut surface is etched with a 1.0 mass % sodium hydroxide aqueous solution; and
a cross-sectional image of the cut surface is acquired, and the cross-sectional image is image-processed to obtain the binarized image.

11. The anode active material for a non-aqueous electrolyte secondary battery according to claim 9,
wherein the non-aluminum metal compound contains one or more selected from the group consisting of Si, Ge, Sn, Ag, Sb, and In.

12. The anode active material for a non-aqueous electrolyte secondary battery according to claim 9,
wherein the anode active material is a metal foil having a thickness of 5 μm or more and 200 μm or less.

13. The anode active material for a non-aqueous electrolyte secondary battery according to claim 9,
wherein the anode active material is a powder having an average particle size of 1 μm or more and 20 μm or less.

14. An anode comprising:
the anode active material for a non-aqueous electrolyte secondary battery according to claim 9.

15. A laminate comprising:
a thin layer and a substrate which are laminated,
wherein the thin layer is formed of the anode active material for a non-aqueous electrolyte secondary battery according to claim 9, and
the substrate is formed of a metal different from the anode active material for a non-aqueous electrolyte secondary battery.

* * * * *